Dec. 29, 1931.   N. C. JACKSON   1,838,404
AEROPLANE
Original Filed Oct. 12, 1928   8 Sheets-Sheet 2

N. C. Jackson, INVENTOR
BY Victor J. Evans
ATTORNEY

Dec. 29, 1931.  N. C. JACKSON  1,838,404
AEROPLANE
Original Filed Oct. 12, 1928    8 Sheets-Sheet 4

Fig. 4.

N. C. Jackson, INVENTOR
BY Victor J. Evans
ATTORNEY

Dec. 29, 1931.  N. C. JACKSON  1,838,404
AEROPLANE
Original Filed Oct. 12, 1928  8 Sheets-Sheet 6

N. C. Jackson, INVENTOR
BY Victor J. Evans
ATTORNEY

Dec. 29, 1931.  N. C. JACKSON  1,838,404
AEROPLANE
Original Filed Oct. 12, 1928   8 Sheets-Sheet 7

N. C. Jackson, INVENTOR
BY Victor J. Evans
ATTORNEY

Dec. 29, 1931.　　　N. C. JACKSON　　　1,838,404
AEROPLANE
Original Filed Oct. 12, 1928　　8 Sheets-Sheet 8

Patented Dec. 29, 1931

1,838,404

UNITED STATES PATENT OFFICE

NEWEL C. JACKSON, OF CASSVILLE, MISSOURI

AEROPLANE

Application filed October 12, 1928, Serial No. 312,170. Renewed March 13, 1931.

This invention relates to an aeroplane, the general object of the invention being to so construct and arrange the parts thereof that the plane will have great efficiency as the maintenance and operating cost will be low, and it can take-off and land in the minimum amount of space, can be driven at low speed as well as high speed, as its speed can be regulated by adjustment of the propeller blades as well as by the engine, and the plane can be easily controlled as its wings can be tilted to any desired position independently of each other or together, with means for causing the exhaust gases from the engine to pass through the wings to prevent ice or snow adhering to the wings.

Another object of the invention is to provide clear vision for the pilot and the passengers and to provide means whereby the occupants can easily and quickly leave the closed fuselage whenever desired.

Another object of the invention is to provide means whereby the wings can be folded and detached from the fuselage so that the plane will occupy the minimum amount of space when stored or when being shipped.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

In these views, the numeral 1 indicates the fuselage of the plane which, as shown, is entirely closed and it is provided with the windows 2, the doors 3 and the seats 4. The front end of the plane slopes downwardly and rearwardly and windows 2' are placed in the sloping portions so that the pilot has clear vision ahead and these windows enable the pilot to see the the landing field so that the landing and take-off are facilitated. If desired, one or more trapdoors may be placed in the bottom of the fuselage for enabling the occupants to leave the same by parachutes if anything should happen to the plane which would cause the occupants to leave it while the plane is in the air. The plane is provided with the usual landing gear 5.

The engine of the plane is shown at 6, and if the engine is of the water cooled type, a radiator 7 is provided therefor. The fuel tank is shown at 8 and its filling spout at 9. The hub of the propeller is shown at 10 and its blades at 11.

A horizontal rudder 12 is arranged at the tail of the fuselage and the cables 13 which are attached to the arms 14 of this rudder extend into the fuselage over the guiding rolls 15 and are attached to a drum 16 which is adapted to be rotated by a hand wheel 17 located to one side of the pilot's seat 4'. Any desired means, such as ratchet means, can be provided for holding the drum and hand wheel in adjusted position and it will, of course, be understood that a vertical rudder may be placed at the tail of the machine if desired or necessary.

Figure 5:
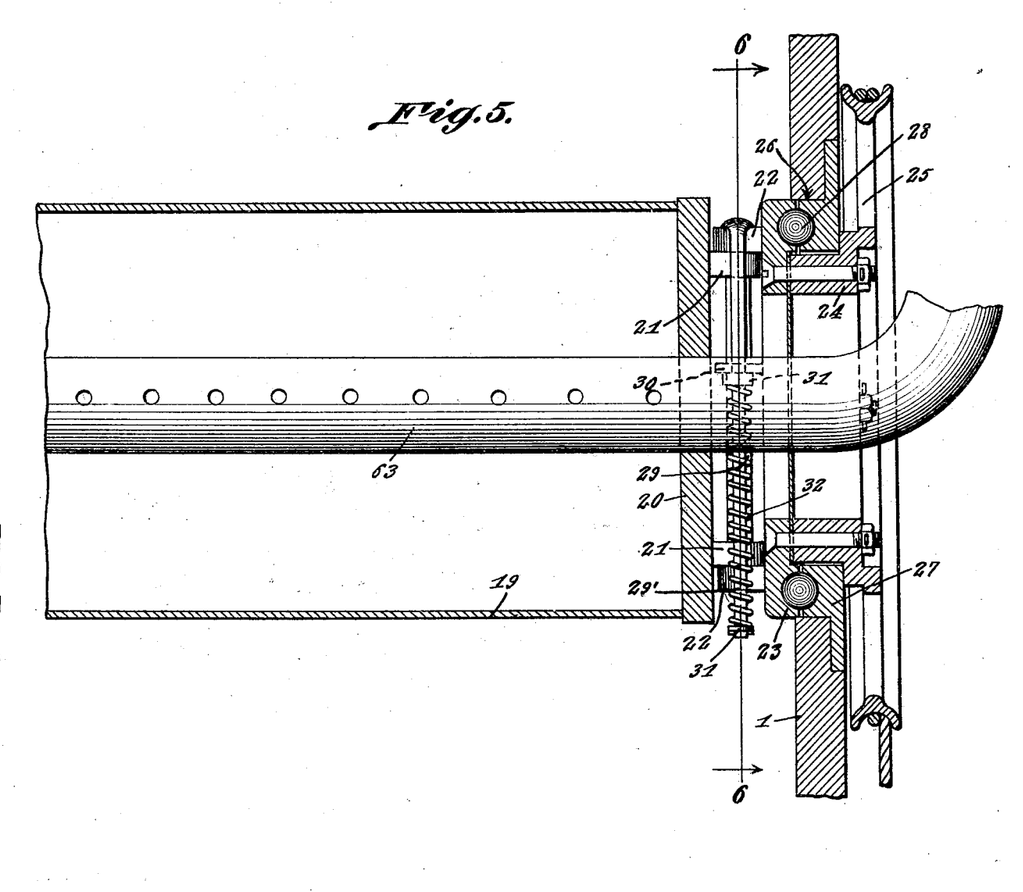
Figure 5 is a sectional view showing the means for detachably connecting a wing to the fuselage and also showing the means whereby the wing can be partly rotated.
Figure 6:
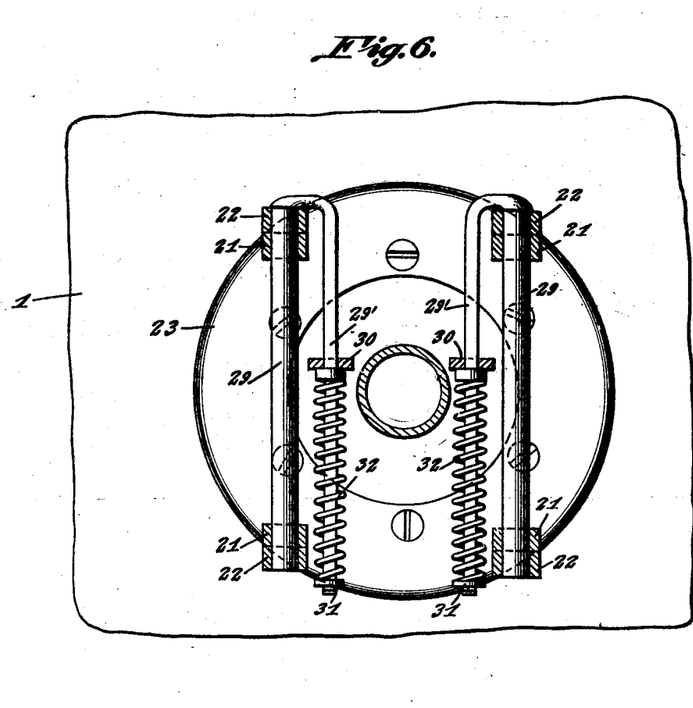
Figure 6 is a section on line 6—6 of Figure 5.

Each wing 18 is carried by a shaft 19 which extends through the interior of the wing transversely and in front of the transverse center of the wing. This shaft 19 is of tubular construction and has its inner end closed by a circular plate 20 which is formed with the two pairs of perforated ears 21. The ears of each pair are in alignment with each other. Two pairs of ears 22 are arranged at each side of the fuselage, these ears 22 being formed on an annular member 23 which is bolted to the hub 24 of a drum 25, the hub extending into an opening 26 formed in each side of the fuselage, with the drum located in the inside of the fuselage. The member 23 is formed with an annular groove and an annular member 27 extends into the opening and is attached to the fuselage and has an annular groove therein which, with the groove in the member 23, forms a ball race for the balls 28. Each pair of ears 22 on the member 23 contacts each pair of ears 21 on the plate 20, with the perforations in alignment so that pins 29 can pass through the perforations in the two sets of ears and thus connect the shaft 19 and its plate 20 to the member 23 and the hub of the drum so that rotary movement of the drum will be communicated to the shaft and thus the wing which is carried by the shaft can be tilted. The pins 29 act to removably connect the wings with the member 23 and therefore with the fuselage so that the wings can be removed from the fuselage when desired. Each pin 29 is of U shape, with the limb which passes through the ears of greater diameter than the other limb and this other limb, which is shown at 29', passes through a forked projection 30 on either the member 20 or the member 23, and carries a pair of washers 31, one of which engages the projection 30 and the other one of which is suitably fastened to the free end of the link and a coil spring 32 is placed between the washers so that this spring will act to hold the U-shaped member with its limb 21 in engagement with the perforated ears. When the pin is to be withdrawn to detach the wing from the fuselage, it is simply necessary to free the upper washer 31 from the projection 30 by swinging the limb 29' away from the projection so that the pin can be moved upwardly out of the perforations in the ears.

A set of struts 33 is provided for each wing, these struts extending upwardly and outwardly from the sides of the fuselage and each set has a yoke 34 at its upper end which supports the anti-friction means 35 which engage each shaft 19 so that the shaft is supported intermediate its ends by the struts and the connection between the shaft and the struts is such that the shaft can rotate without interference from the struts.

Figure 9:
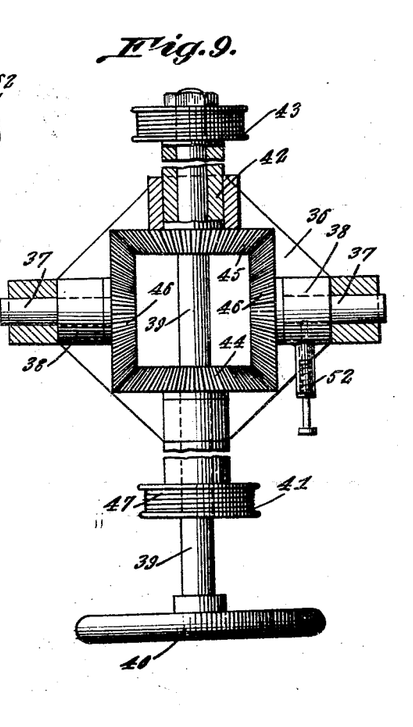
Figure 9 is a sectional view through the means for operating the wings.
Figure 10:
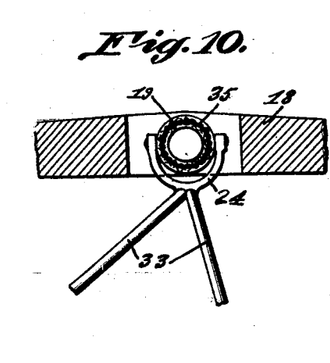
Figure 10 is a detail sectional view on line 10—10 of Figure 3.

A casting 36 is supported for rocking movement in the fuselage in front of the pilot's seat through means of the stub shafts 37 engaging the bearing members 38 and a shaft 39 is journaled in the casting and is arranged at rightangles to the shafts 37 and passes between the spaced inner ends of said shafts. A hand wheel 40 is attached to the rear end of this shaft 39 and a drum 41 is fastened to the shaft adjacent the hand wheel. A sleeve 42 is rotatably mounted on the other end of the shaft and has attached thereto a drum 43. A beveled gear 44 is fastened to the shaft 39 and an oppositely arranged beveled gear 45 is loosely mounted on the shaft 39, but is fastened to the inner end of the sleeve 42 and oppositely arranged idle gears 46 are loosely arranged on the adjacent ends of the shafts 37, these gears 46 meshing with the gears 44 and 45 so that when the shaft 39 is turned by its hand wheel 40, the drum 41 will be turned with the shaft, while the drum 42 and the sleeve 43 will be turned in an opposite direction from that of the shaft and its drum through the gearing 44, 46 and 45. It will be seen that by raising or lowering the hand wheel, the casting 36 and the shaft 39 and the parts associated therewith can be rocked on a horizontal axis formed by the stub shafts or trunnions 37. In this movement, one of the drums 41 will be raised, if the hand wheel is raised, and the other drum will be lowered.

Figure 1:
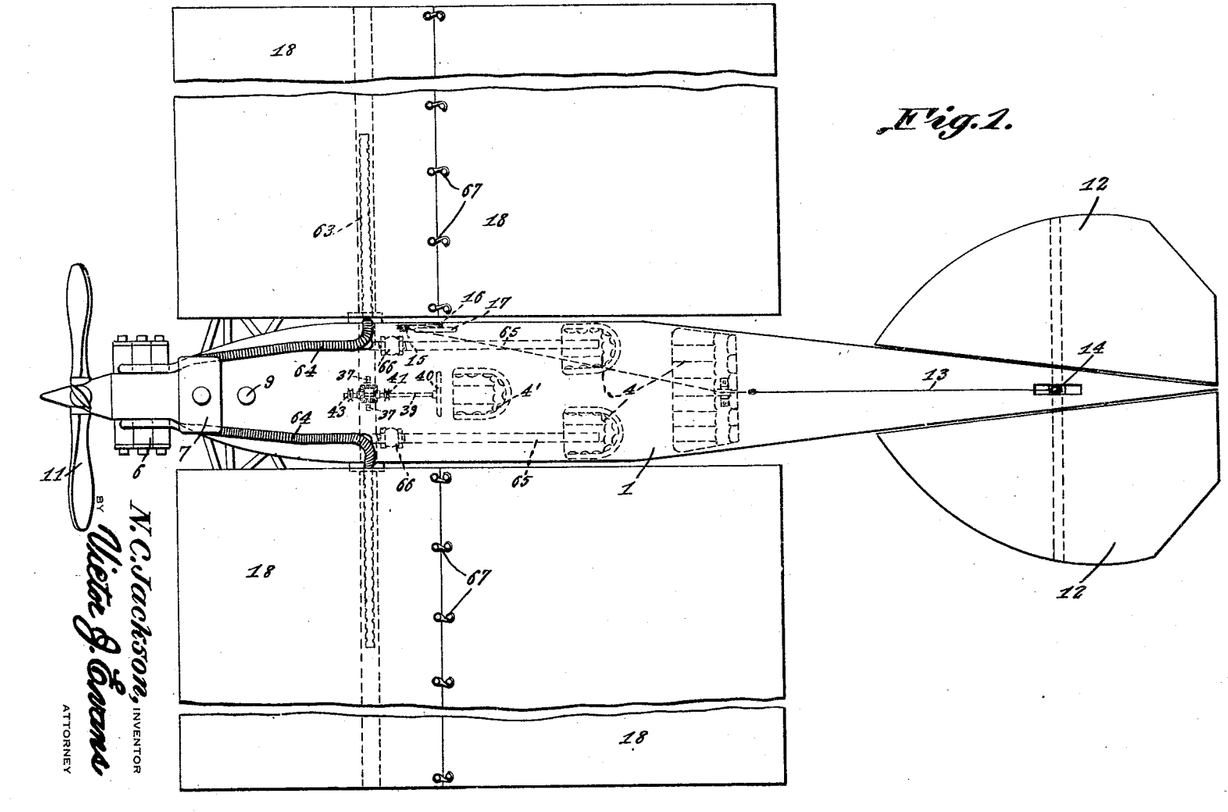
Figure 1 is a plan view of the improved plane.
Figure 2:
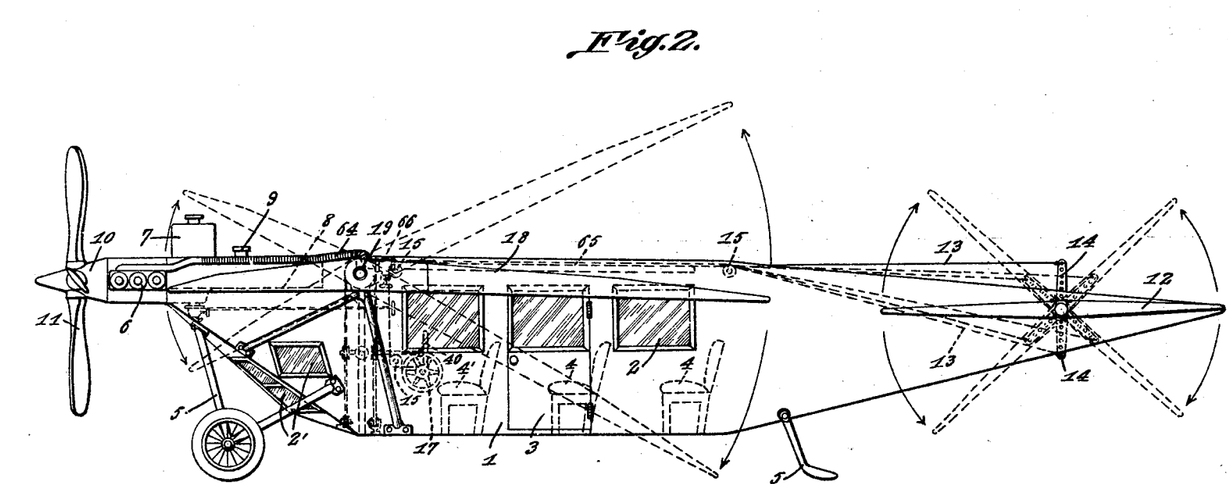
Figure 2 is a side view thereof.
Figure 3:
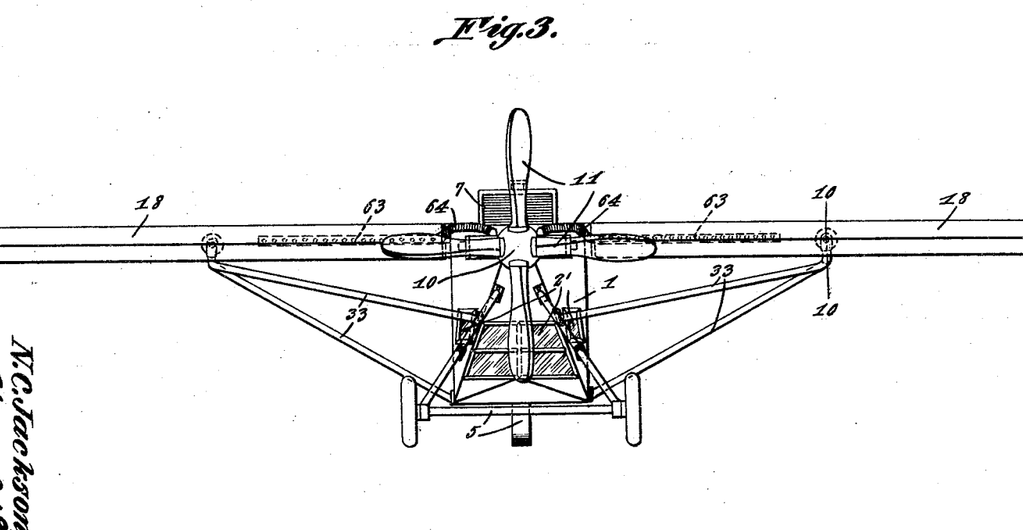
Figure 3 is a front view.
Figure 4:
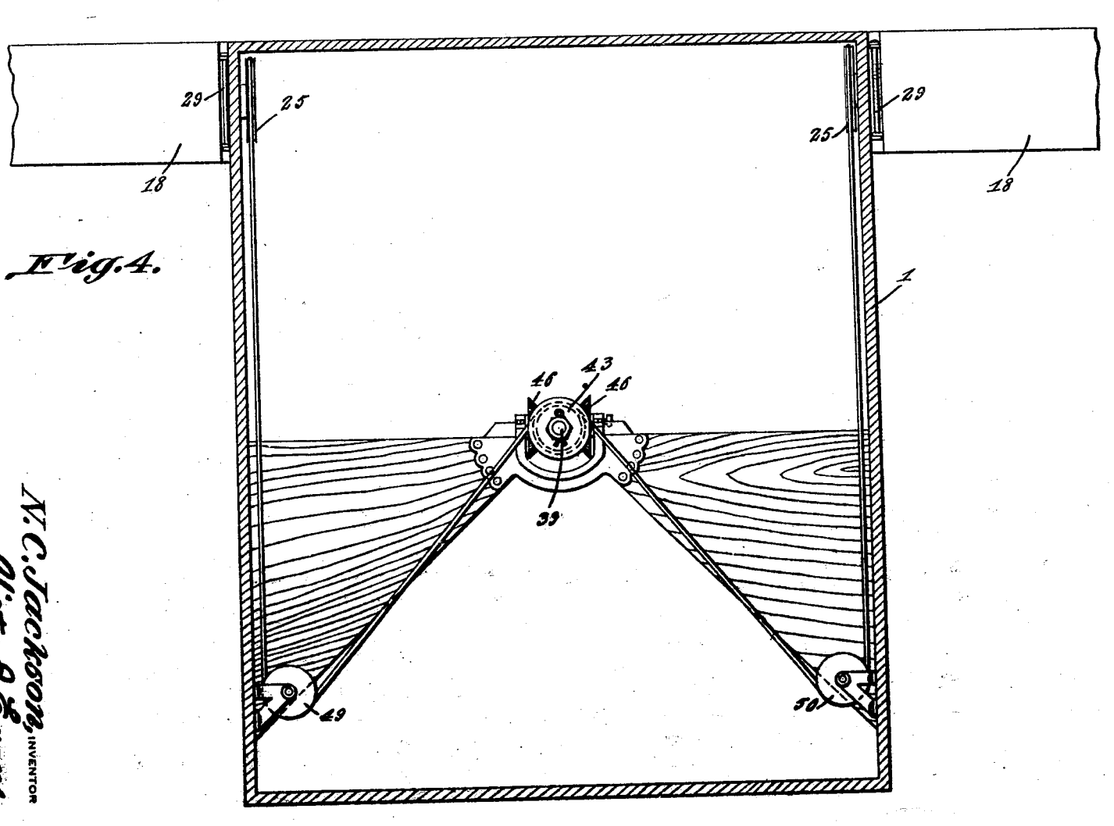
Figure 4 is a transverse sectional view showing the means for operating the wings.
Figure 11:
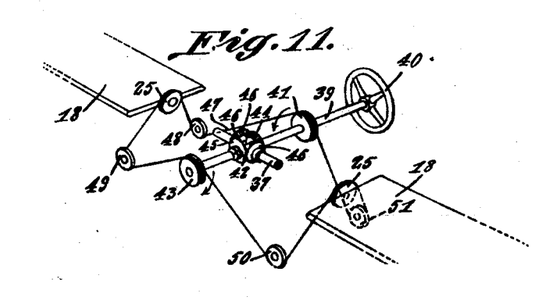
Figure 11 is a diagrammatic view of the means for operating the wings.

A cable 47 is wound around the drum 41 and one part of the cable passes from the top of said drum under a guiding pulley 48 up to the drum 25 of one of the wings, and after being passed several times around said drum 25, the cable passes downwardly under a guiding pulley 49 and up to the drum 43, around which it is passed several times, the cable being wound around the drum 43 in an opposite direction from which it is wound around the drum 41. From the drum 43, the cable passes downwardly under a pulley 50 and then the cable passes upwardly over the drum 25 of the opposite wing and after being wrapped several times around this drum the cable passes downwardly under a pulley 51 and then upwardly to the drum 41. A single length of cable may be used or sections of cable may be used which are suitably fastened to the drum, but as shown in the diagrammatic view (Figure 11), the cable must be so arranged on the drums that when the hand wheel is turned in one direction, the cable is so moved that one of the drums 25 is turned in one direction and the opposite drum 25 in an opposite direction so that the wings will be tilted in opposite directions, as shown in dotted lines in Figure 2. Of course, by turning the hand wheel in an opposite direction, the wings will be tilted in opposite directions as before, but the wings will be arranged opposite to the position they occupy when the wheel 40 is turned in the first instance. When the wings are to be moved in unison in the same direction, the wheel 40 is either lifted or lowered so as to rock the casting and the parts carried thereby about its horizontal axis and this movement will cause the cable to be so actuated that both drums 25 will move in the same direction as will be clear from an inspection of Figure 12.

Suitable locking means are provided for holding the controlling means in adjusted position, such means being shown in the drawings in the form of a spring plunger 52.

Figure 7:
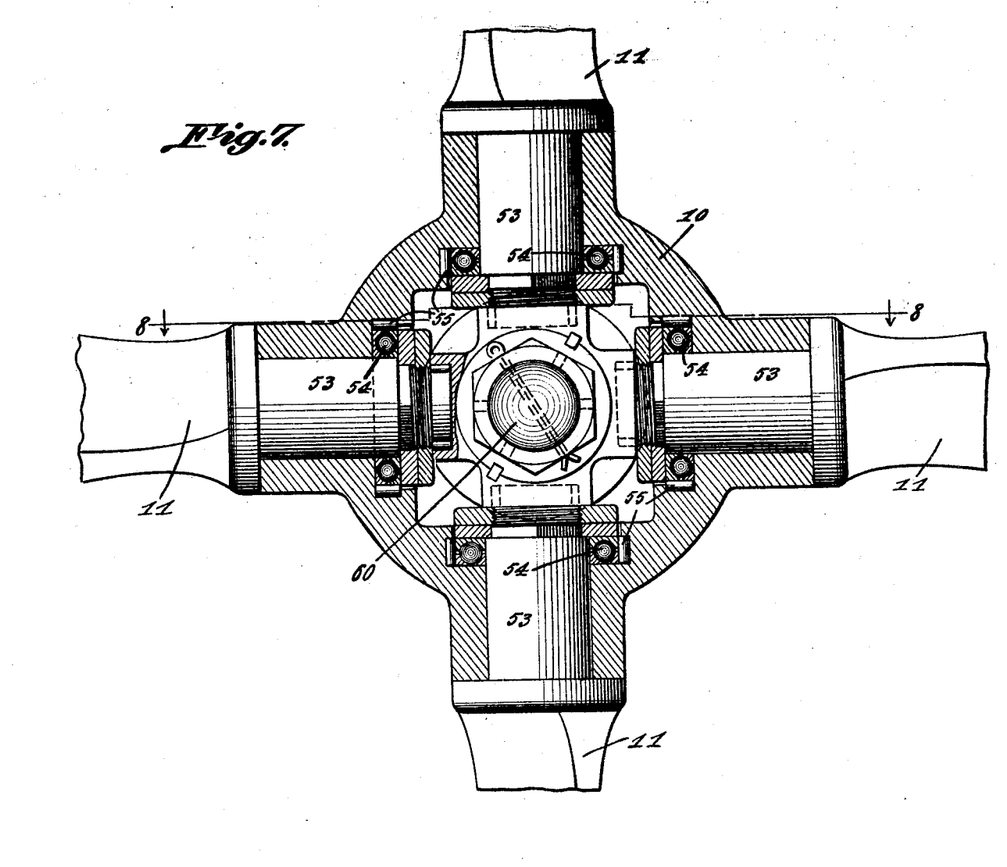
Figure 7 is a sectional view through the hub of the propeller.
Figure 8:
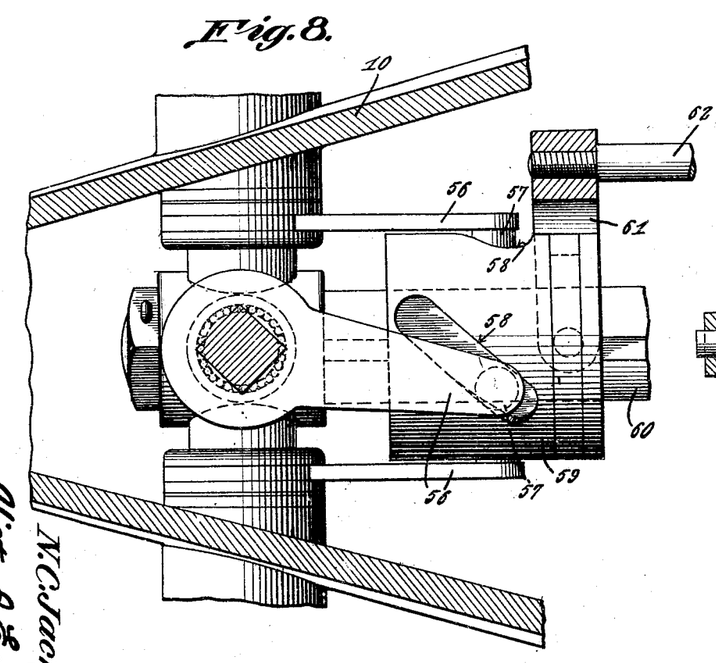
Figure 8 is a section on line 8—8 of Figure 7.

The blades 11 of the propeller have their stems 53 rotatably arranged in the hub 10 and suitable anti-friction means, such as the ball bearings 54 and the roller bearings 55 are provided for reducing friction between the bearing parts of the hub and stems. An arm 56 is attached to each stem within the hub, each arm extending rearwardly and having a pin 57 thereon which engages an inclined slot 58 formed in a sleeve 59 slidably but non-rotatably mounted on the propeller shaft 60 which is suitably attached to the engine. This sleeve has a groove therein which is engaged by pins on a yoke 60 and a rod 62 is connected to said yoke and passes to a point adjacent the pilot's seat so that the pilot can move the sleeve 59 on the shaft 60 and thus cause the arms to partly rotate the propeller blades to adjust the pitch of said blades. This will enable the pilot to control the speed of the plane through the propeller.

The perforated pipes 63 pass into the pipes 19 from the fuselage so that the rocking movement of the wings will not be interfered with by these perforated pipes. Tubes 64 connect these pipes with the exhaust of the engine so that the exhaust gases will pass into the wings and thus prevent ice or snow from collecting on the wings. Of course, the wings must be provided with suitable outlet ports in their rear portions to permit the exhaust gases to escape therefrom.

The exhaust tubes are provided with extensions 65 which extend through the rear part of the fuselage and suitable valves 66 are provided for causing the exhaust gases to either flow through the extensions 65 or through the perforated pipes. When there is no danger of ice forming on the wings, the exhaust gases are caused to pass through the extensions 65, but when there is such a danger or the plane encounters a snow storm, then the exhaust gases are caused to pass into the wings.

Each wing is formed of front and rear sections which are hingedly connected together and which are provided with latch means 67 for holding them in unfolded position.

From the foregoing it will be seen that the wings can be detached from the fuselage and folded so that the plane will occupy the minimum amount of space when stored or shipped and it will also be seen that I have provided an efficient aeroplane, the speed of which can be controlled both from the engine and by the adjustment of the propeller blades, so that the cost of operation will be low and the plane can take-off from and land on small fields. The wings can be adjusted to control the flight and take-off and landing of the plane from the manually operated controlling means which enables the wings to be moved simultaneously or individually and the ice and snow hazards are eliminated by the means for heating the wings by the exhaust gases from the engine. The pilot has a clear vision in flight and in landing and take-off and the occupants can ride in comfort as the fuselage is entirely enclosed.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An aeroplane comprising an enclosed fuselage, wings pivotally connected with the fuselage, manually operated means for moving the wings about their pivots simultaneously and in the same direction or in different directions, a propeller having its blades rotatably connected with the hub thereof, manually operated means for adjusting the blades to any desired pitch, means for detachably connecting the wings to the fuselage, each wing being formed of sections hingedly connected together and latch means for holding the wings in unfolded position.

2. An aeroplane comprising a fuselage, a rotary member at each side thereof, a wing detachably connected with each rotary member, a drum on the inner end of each rotary member, a supporting member rotatably supported in the fuselage whereby the member can be moved about a horizontal and transverse axis, a shaft journaled in said supporting member and extending at right angles to the axis, drums on the shaft, flexible means connecting the drums on the shaft with the drums on the rotary members, a handle on the shaft and gearing associated with the shaft whereby rotary movement thereof will cause one drum to rotate in one direction and the other drum in an opposite direction so as to cause the flexible means to move the rotary members to which the wings are connected in opposite directions and to cause the rocking movement of the supporting member on its axis to move the rotary members and the wings in the same direction.

In testimony whereof I affix my signature.

NEWEL C. JACKSON.